United States Patent [19]
de Buda et al.

[11] Patent Number: 5,510,781
[45] Date of Patent: Apr. 23, 1996

[54] ULTRASONIC ROTARY SHAFT POSITION ENCODER

[75] Inventors: Eric de Buda, Toronto; Stewart deWalle, Brampton, both of Canada

[73] Assignee: Ontario Hydro, Toronto, Canada

[21] Appl. No.: 231,004

[22] Filed: Apr. 21, 1994

[51] Int. Cl.⁶ .................................. H03K 13/02
[52] U.S. Cl. ........................ 341/11; 250/231.13
[58] Field of Search ..................... 341/1, 11, 13; 250/214 PR, 231.13

[56] References Cited

U.S. PATENT DOCUMENTS

| | | | |
|---|---|---|---|
| 3,351,856 | 11/1967 | Luttrell, Jr. | 324/99 |
| 4,056,722 | 11/1977 | Ray | 250/231 |
| 4,368,641 | 1/1983 | McLeod, Jr. | 73/597 |
| 4,481,819 | 11/1984 | Yoneyama | 73/593 |
| 4,500,870 | 2/1985 | Krohn et al. | 341/14 |
| 4,709,580 | 12/1987 | Butts, Jr. | 73/178 |
| 4,746,791 | 5/1988 | Forkel | 250/231 |

Primary Examiner—Marc S. Hoff
Attorney, Agent, or Firm—Ridout & Maybee

[57] ABSTRACT

A device and method for monitoring the angular displacement of a rotating shaft provides an ultrasonic transceiver reflecting pulses off of a reflecting edge of a vane of a rotor affixed to the shaft. The reflecting edge is configured in the profile of an involute curve so that changes in the time delay between transmission and reception of each reflected pulse, which correspond to changes in the distance between the transceiver and the reflecting edge, are linearly related to changes in the angular displacement of the shaft, and arranged such that the reflecting edge is normal to the probe axis so that the energy is reflected back to the probe. A circular disc may be associated with the vane to provide a reference reflected pulse, which eliminates errors which might occur due to wobbling of the shaft.

17 Claims, 4 Drawing Sheets

ULTRASONIC ROTARY SHAFT POSITION ENCODER

FIELD OF INVENTION

This invention relates to a rotary shaft position encoder. In particular, this invention relates to an ultrasonic device for determining the angular displacement of a rotating or stationary shaft.

BACKGROUND OF THE INVENTION

There are many situations involving machinery or apparatus having a shaft which may rotate, in which it is necessary or desirable to monitor the angular displacement of the shaft, either continuously or at specified intervals. Applications for a device for this purpose include under water applications, and while rotary shaft position encoders do exist, most are not designed to operate under water. To use a conventional encoder in such applications requires that it be built into a waterproof housing, which adds size, weight and cost to the device.

The present invention overcomes this disadvantage by providing a rotor having a vane which is configured with an edge having an involute profile, affixed to the rotary shaft. An ultrasonic probe transmits energy waves in the form of ultrasonic pulses to the rotor, which are reflected off of the involute edge back to the probe. The time delay between transmission of the energy pulse and reception of the reflected pulse is directly proportional to the distance of the probe from the rotor or, more specifically, to the portion of the involute edge reflecting the ultrasonic pulse. Since the vane of the rotor includes an involute curve, the change in distance, and therefore the duration of the time delay, will always be proportional to the angular displacement of the shaft.

A method of remote reading of utility meters is disclosed in U.S. Pat. No. 4,500,870 by Krohn et al, which utilizes a light probe reflecting light off of a cam having a curved circumferential surface. As the meter shaft rotates, the circumferential surface of the cam approaches or recedes from the light source, and a photodetector is used to monitor the change in the intensity of light, the square of which is inversely proportional to the distance between the light source and the reflecting surface. However, this system presents significant disadvantages.

First, this device relies on the intensity or amplitude of the reflected signal to determine distance from the reflecting surface. Since the inverse square rule applies to intensity, there is not a linear relationship between the intensity of the reflected light and the distance from the cam.

Second, because the circumferential surface of this device is not necessarily involute, the circumferential surface of the cam is not necessarily (and in general would not be) perpendicular to the optical axis of the light source/receiver. This means that the device must rely on diffuse reflection, otherwise the reflected light would in general not reflect back to the receiver. This further affects the intensity readings by the photodetector, and thus the distance calculation, because the reflecting surface cannot be guaranteed to be uniform and reflect the light evenly. In an underwater application this problem is exacerbated, because the reflecting surface would quickly lose its reflectivity, and non-uniformly. For these reasons it would be particularly difficult to adapt this device for use underwater, where ambient light and murky conditions will also affect the light intensity measured by the photodetector.

The present invention is not subject to these disadvantages, because the distance measurement is calculated from the time delay of the transmitted pulse, which has a linear relationship with distance. This renders the device of the present invention more precise than the Krohn device by orders of magnitude. Furthermore, the use of an involute curve profile in the present invention permits the use of conventional ultrasound technology, which is much more suitable for use in underwater applications but requires that the sound energy be reflected directly back to the probe rather than diffusely scattered by the reflecting surface. The involute profile ensures this, in that the axis of the ultrasonic probe will always be perpendicular to the reflecting surface on the involute edge of the rotor vane.

SUMMARY OF THE INVENTION

The present invention thus provides a device for monitoring the angular displacement of a rotating shaft, comprising a rotor being provided with a reflecting edge configured in the profile of an involute curve, means for transmitting an energy wave toward the reflecting edge, and means for receiving the energy wave after reflection off of the reflecting edge.

The present invention further provides a rotor for a device which measures the angular displacement of a rotary shaft, the rotor being provided with a reflecting edge configured in the profile of an involute curve.

The present invention further provides a method of measuring the angular displacement of a rotary shaft provided with a rotor having a reflecting edge configured in the profile of an involute curve, comprising periodically reflecting an energy wave off of the reflecting edge, measuring a delay between transmission of the energy wave and reception of the reflected energy wave, and determining the angular position of the shaft from the delay.

In a preferred embodiment, the energy wave is an ultrasonic pulse.

BRIEF DESCRIPTION OF THE DRAWINGS

In drawings which illustrate by way of example only a preferred embodiment of the invention.

DETAILED DESCRIPTION OF THE INVENTION

Figure 1:
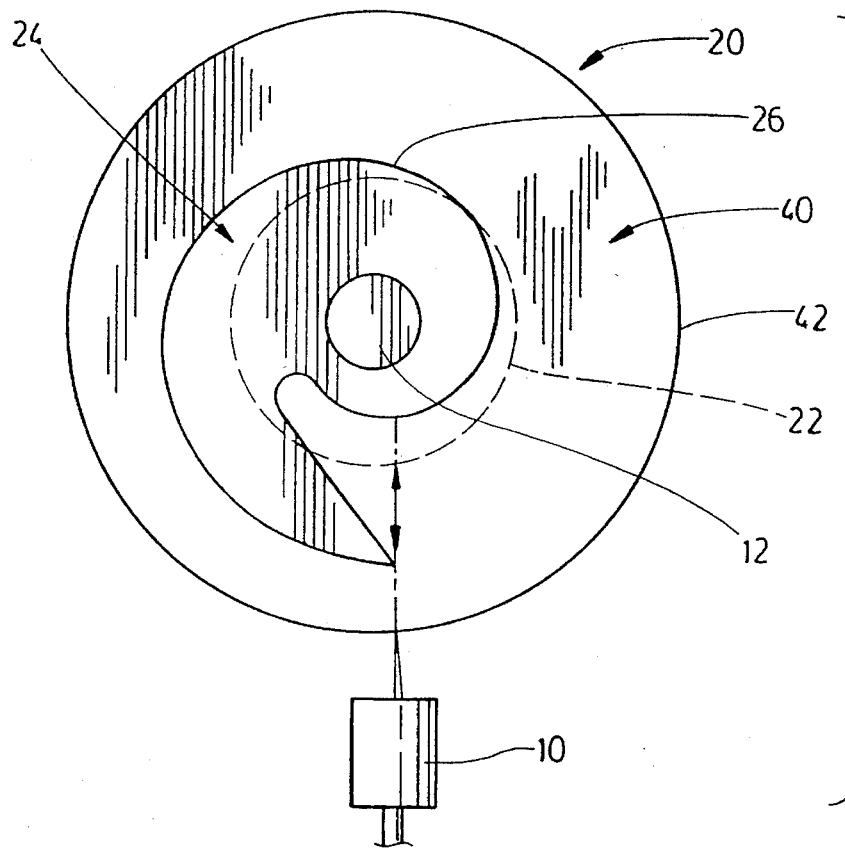
FIG. 1 is a front elevation of the rotary shaft encoder of the present invention.
Figure 3:
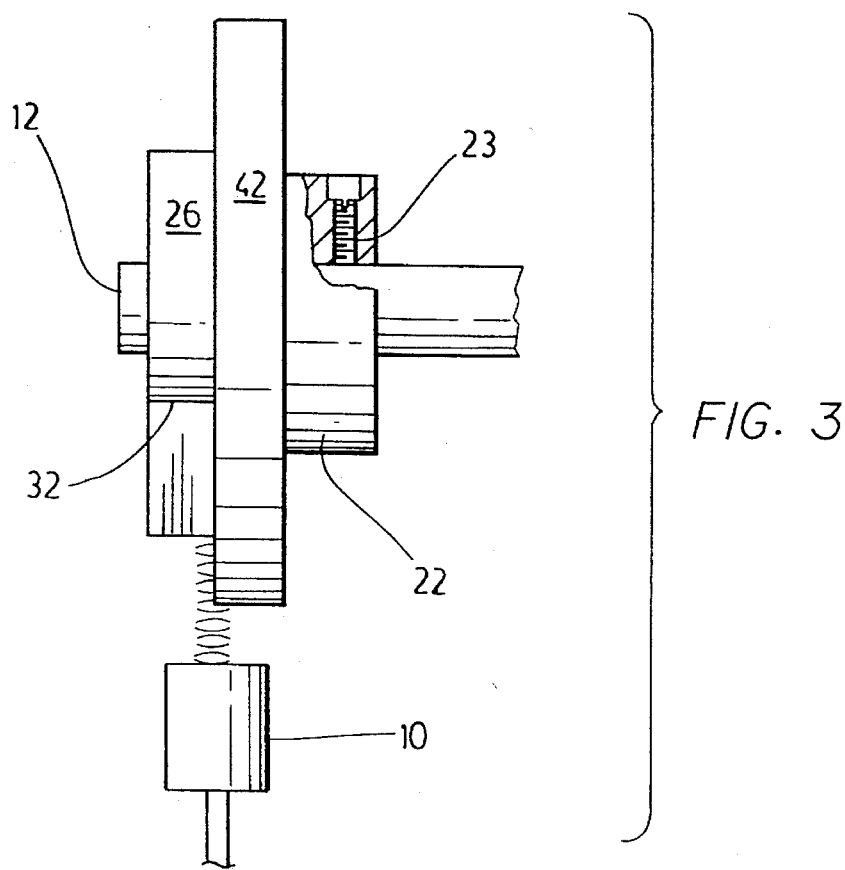
FIG. 3 is a side elevation of the rotor of FIG. 1.

A preferred embodiment of the rotary shaft encoder of the present invention is illustrated in FIG. 1. The device comprises a conventional ultrasonic probe 10, which may also be radiation resistant, for transmitting and receiving an ultrasonic pulse, and a rotor 20 comprising one vane 24 mounted on a circular disc 40 affixed to the rotor hub 22. The rotor hub 22 is provided with a locking screw 23 or other similar means for securing the rotor 20 to a rotary shaft 12, as shown in FIG. 3.

Figure 1A:
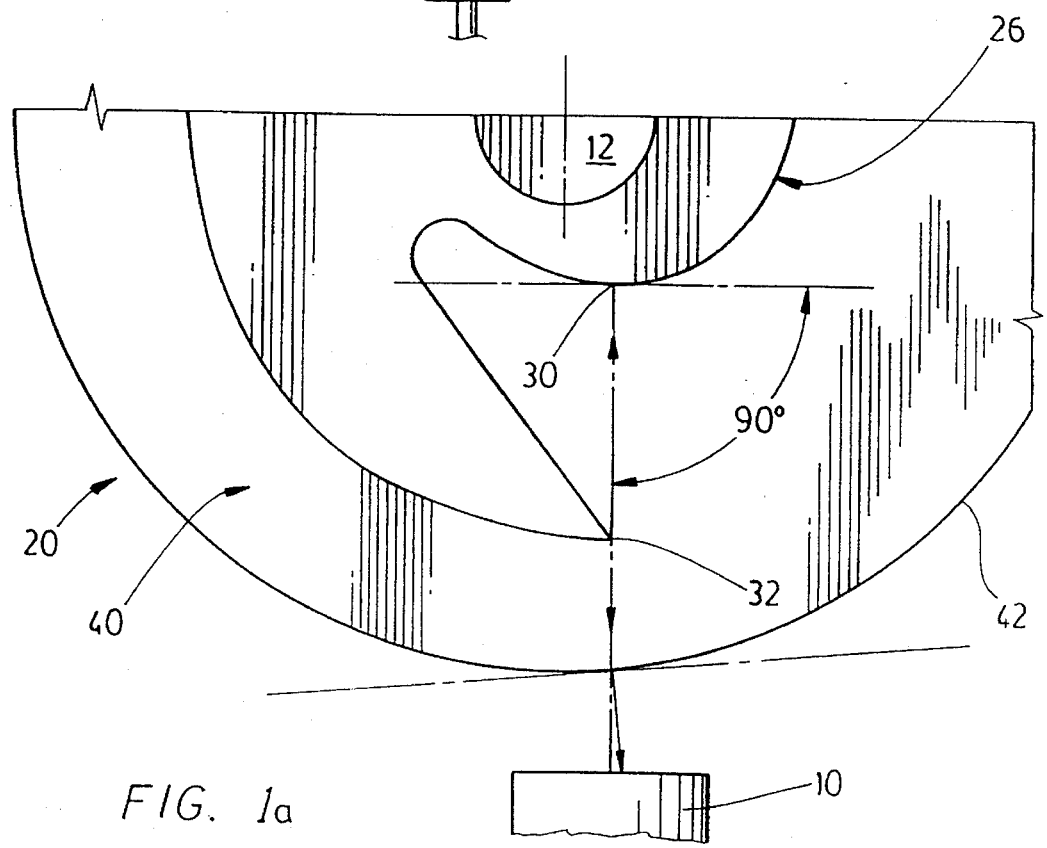
FIG. 1a is an enlarged partial elevation of the encoder of FIG. 1.

The vane 24 is planar and is preferably formed integrally with the disc 40 and hub 22. The vane 24 is provided with a reflecting edge 26 sufficiently wide to reflect an ultrasonic pulse emitted by the probe 10, the edge 26 being configured in the form of an involute curve having a proximal end 30, and increasing in its distance from the shaft 12 to a distal end 32, according to the characteristics of an involute curve. The proximal end 30 of the reflecting edge 26 contacts the axis of the probe 10 at the same angular rotor position at which the distal end 32 contacts the axis of the probe 10, as shown in FIG. 1a.

The involute curve provides a linear relationship between angle and distance. By definition, an involute curve is a curve C produced by any point of a perfectly flexible inextensible thread that is kept taut as it is wound upon or unwound from a circular curve $C_i$. Thus, every normal to the curve C (for example the thread) is a tangent to the curve $C_i$ at the tangent point (the point where the thread meets the curve $C_i$).

Taking the rotor 20 as an example, if a string were wound clockwise around an imaginary spool coaxial with the rotor 20 and of the correct diameter, a pencil tied to the string at the proximal end 30 of the reflecting edge 26 would trace the path of the edge 26 as the string is unwound from the imaginary spool. At each point along the edge 26, the string would be tangent to the spool and normal to the edge 26.

In the embodiment shown in FIG. 1, the edge 26 of the vane 24 extends more than 360 degrees around the shaft 12. Thus, the vane 24 completely circumscribes the shaft 12 and the reflecting edge 26 overlaps itself (as seen in side view), to prevent the encoder from reading a dead spot at the transition between the proximal end 30 and the distal end 32 of the reflecting edge 26.

When the ultrasonic probe 10 is set at a fixed distance from the hub 22 so as to face the edge 26, the distance from the probe 10 to each point along the edge 26 decreases linearly relative to an increase in the angular displacement of the hub 22 (and therefore of the rotary shaft 12 to which the hub 22 is affixed).

As can be seen from FIG. 1a, the axis of the probe 10 must be offset from the axis of the rotor 20, in order to ensure that the ultrasonic pulse is reflected off of the edge 26 back to the probe 10. Because of the configuration of an involute curve, if the axis of the probe 10 were aligned with the axis of the rotor 20 the ultrasonic pulse would be reflected away from the edge 26 at an angle (in the embodiment illustrated in FIG. 1 the pulse would be reflected to the left of the probe 10). The axis of the probe 10 is thus offset from the axis of the rotor 20 by a distance equal to the radius of the imaginary spool from which the string tracing the path of the involute curve is unwound, as described in the example given above.

The disc 40 is also provided with a reflecting edge 42. The purpose of the disc 40 is to compensate for inaccuracies which might be introduced into the distance measurement (i.e. the distance of the probe 10 from the reflecting edge 26 at any particular angular displacement of the shaft 12) by shaft wobble. If the shaft 12 is not perfectly straight, or does not rotate perfectly within its bearings, the slight wobble which would thus be produced would at times add measurement error to the distance measurement. Given the gradual change in distance inherent in the involute reflecting edge 26, even a small wobble in the shaft 12 can significantly affect the computed angular displacement thereof. The disc 40 thus serves as a fixed point relative to the reflecting edge 26, regardless of shaft wobble, which the device uses to reference each distance measurement. Rather than calculating the absolute distance from the probe 10 to the reflecting edge 26, the processing means calculates the distance between the reflecting edge 42 of the disc 40 and the reflecting edge 26 of the vane 24 along the axis of the probe 10.

Figure 2:
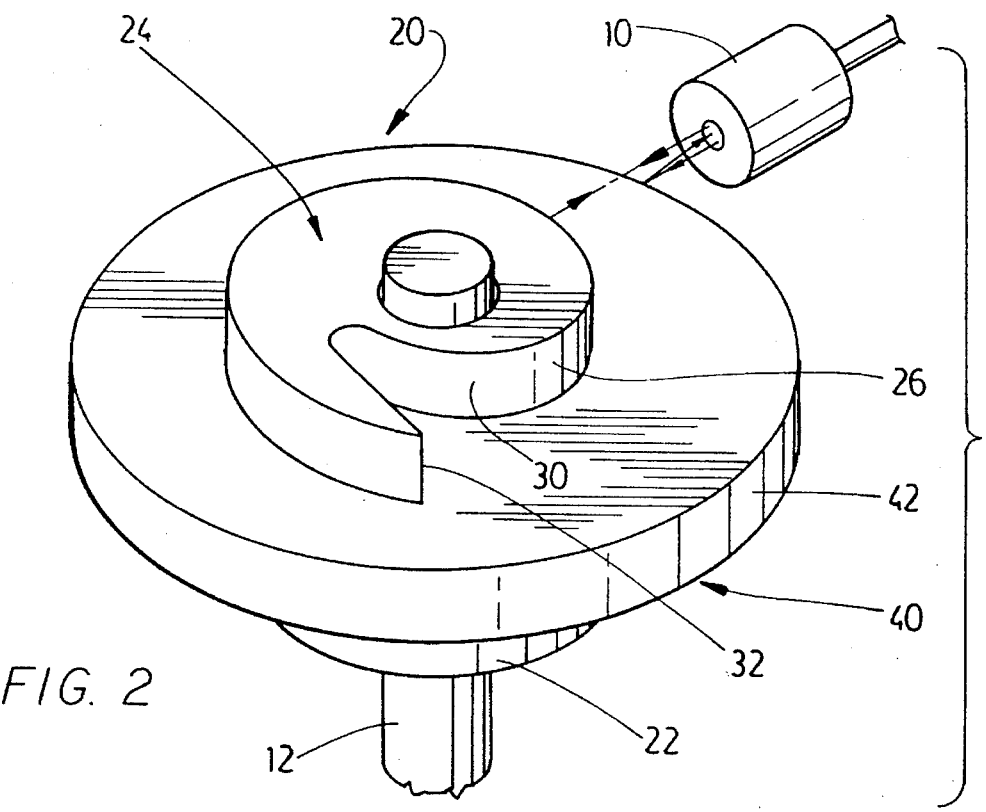
FIG. 2 is a perspective view of the rotor of FIG. 1.

The probe 10 is thus positioned so that the ultrasonic pulse reflects off of both the reflecting edge 26 of the vane 24 and the reflecting edge 42 of the disc 40, as shown in FIG. 2. Because the axis of the probe 10 is offset from the axis of the rotor 20 so that the reflecting edge 26 reflects pulses directly back to the probe 10, the pulse reflected off of the reflecting edge 42 of the disc 40 (which is circular) will not reflect directly back to the probe 10. Thus, the probe 10 should be placed close to the reflecting edge 42 of the disc 40, in order to ensure that a sufficient portion of the ultrasonic pulse reflects off of the edge 42 back to the probe 10, as can be seen in FIGS. 1 and 2, so that the disc 40 can be used as a reference point in the distance calculation.

The operation of the device is accordingly as follows. The device is preferably calibrated with the probe 10 aimed directly at the proximal end 30 and the distal end 32 of the edge 26 of the vane 24, as in FIGS. 1 and 1a. The rotor 20 is affixed to the rotary shaft 12 and the ultrasonic probe 10 is fixed in place at a selected distance from the rotor 20. It is unnecessary to determine the actual distance between the probe 10 and the rotor 20.

The distance (d) between the reflecting edge 42 and the reflecting edge 26 along the axis of the probe 10, as detected by the probe 10 and processed by a computer or other processing means, thus provides the angular displacement of the rotary shaft 12 in linear relation to the measured change in distance. To avoid confusing readings caused by echoes and reflection off of surfaces other than the reflecting edges 26, 42, only the first two energy pulses received by the probe 10 are processed after each energy pulse is emitted by the probe 10.

It will be appreciated that the involute edge 26 of the vane 24 cannot be perfectly machined; slight variations from a perfect involute are bound to occur, which will cause errors in the calculated distance between the edge 42 of the disc 40 and the reflecting edge 26. To compensate for slight deviations in the involute profile, a linear table of calibrating values, determined from point by point calibration of the rotor 20, can be programmed into the processing means. The processing means would then compare each calculated value of the distance between the reflecting edges 42 and 26 with the previously input table of values, and correlate to the known angular displacement of the shaft 12 corresponding to that value.

A counter may be employed in the processing means to take into account angular displacement of the shaft beyond 360 degrees; each sudden change in measured distance (i.e. delay) would indicate that the axis of the probe 10 has moved from one end 30, 32 of the reflecting edge 26 to the other, and the measured value of angular displacement of the shaft 12 would be adjusted accordingly. The number of complete rotations of the shaft 12 can thus be determined. In this fashion, the angular orientation of the rotary shaft 12 can always be determined to the degree of precision required in most applications.

Figure 4:
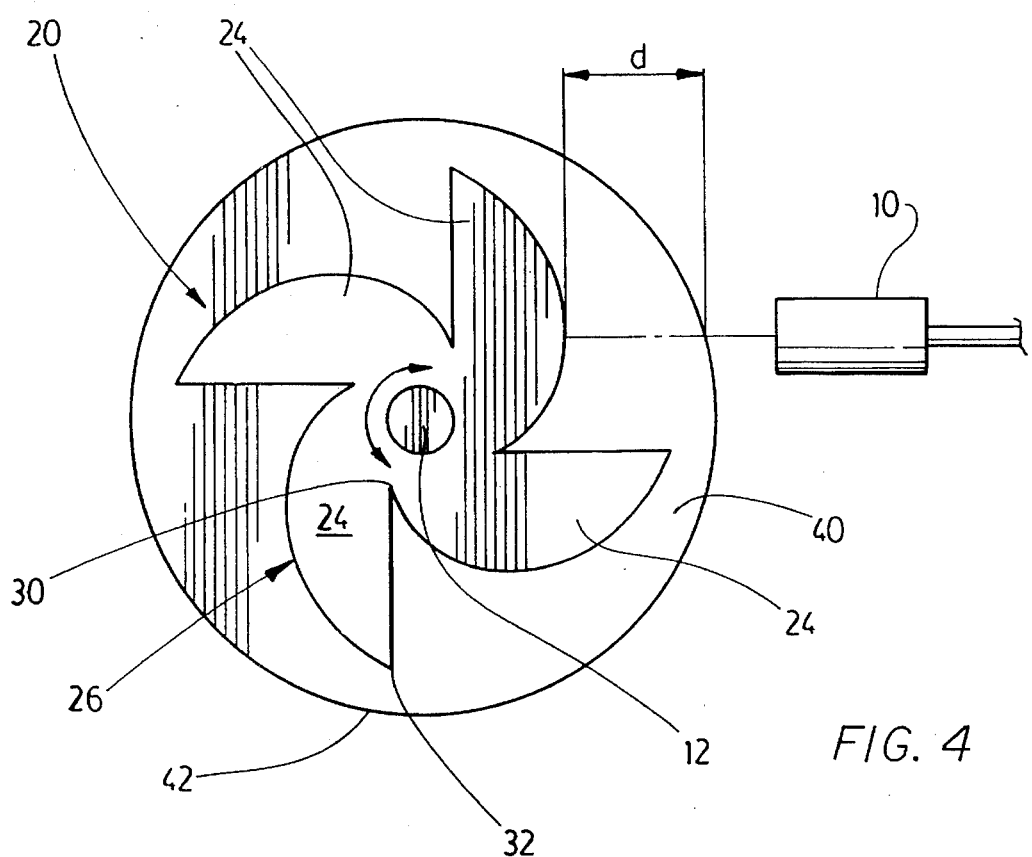
FIG. 4 is a front elevation of a variation of the rotary shaft encoder of the present invention having four vanes.

A further embodiment of the invention having four vanes 24 is illustrated in FIG. 4. In this embodiment, the edge 26 of each vane 24 extends (between the proximal end 30 and the distal end 32) at least 90 degrees around the hub 22, and preferably slightly more than 90 degrees, so that the reflecting edge 26 of vane 24 slightly overlaps the reflecting edge 26 of the next vane 24. In this fashion, there is a sufficient overlap between vanes 24 to prevent the encoder from reading a dead spot at the transition.

Figure 5:
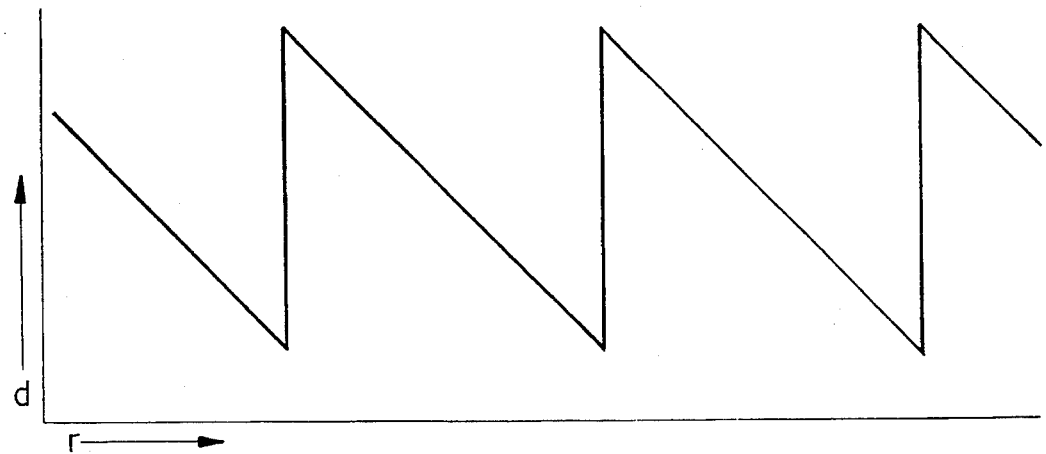
FIG. 5 is a graph showing the relationship between the distance (d) from the reflecting edge of the disc to the reflecting edge of the vane and the angular displacement (r) of the shaft.

FIG. 5 illustrates the relationship between the distance (d) between the reflecting edge 26 of the vane 24 and the reflecting edge 42 of the disc 40, and the angular displacement (r) of the shaft 12. Again, a counter may be employed in the processing means to take into account angular movement of the shaft 12 beyond 90 degrees.

Figure 6:
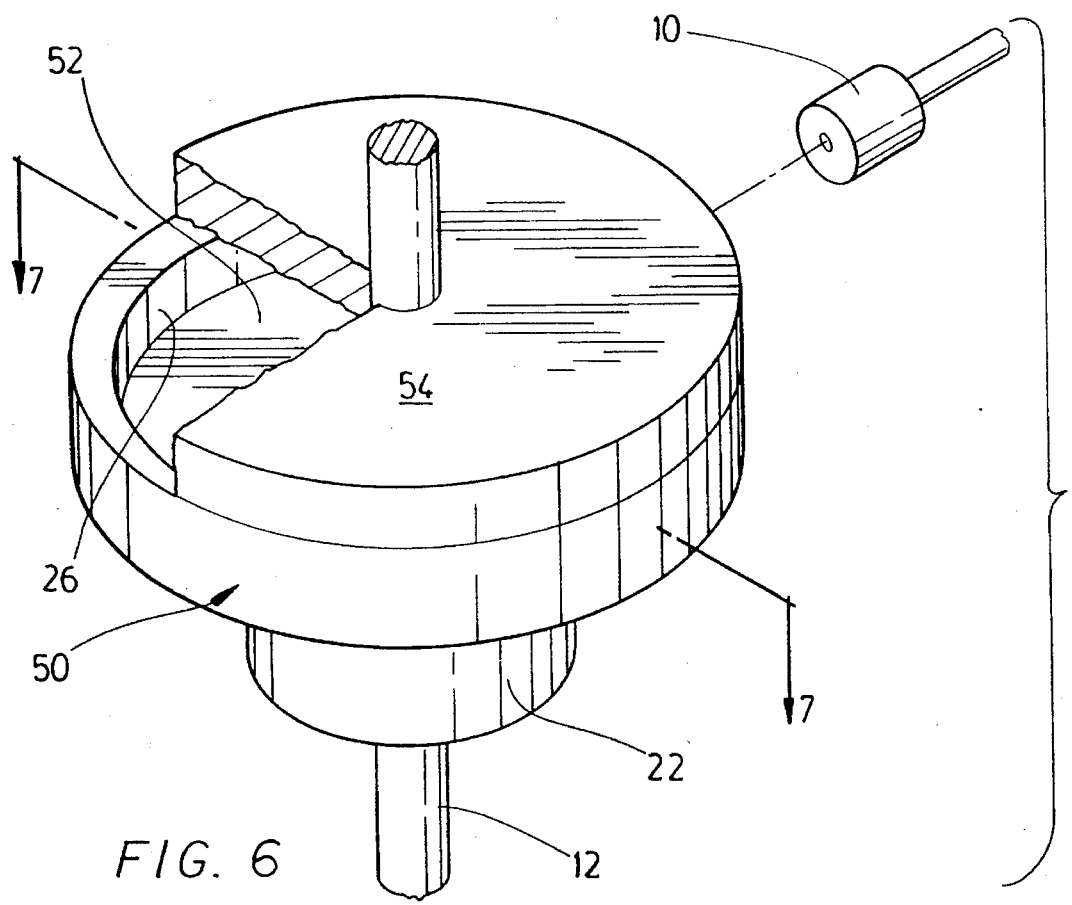
FIG. 6 is a perspective view of a further variation of the rotary shaft encoder, partially cut away to show an inner involute curve.
Figure 7:
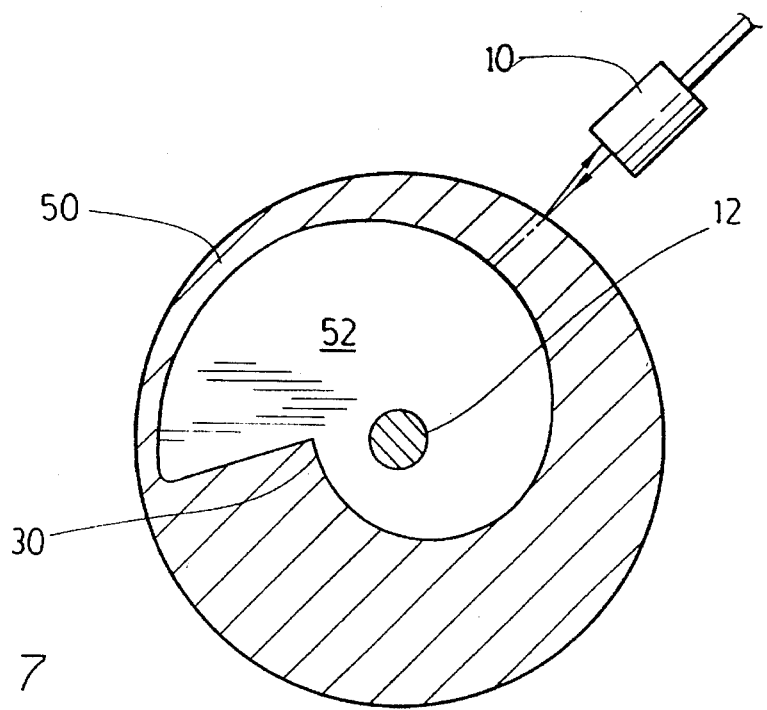
FIG. 7 is a cross-section of the encoder of FIG. 6.

In a still further embodiment of the rotary shaft encoder, illustrated in FIGS. 6 and 7, attached to the hub 22 or integral therewith is a disc 50 having a hollowed out portion 52 in the shape of the involute curve described above. A cover 54 conceals the hollow portion 52, as shown in FIG. 6, such that the disc 50 and cover 54 together form a disc-shaped exterior. The advantage to this embodiment is that it eliminates the turbulence that will be produced by the embodiment of FIG. 1 when rotating in a liquid, with the amount of turbulence increasing as the speed of rotation increases, because of the shape of the external vane 24. This turbulence causes interference with the ultrasonic pulse, which increases as the rotational speed of the rotor increases, until insufficient energy is returned to the probe 10 to allow the encoder to operate. Thus, this turbulence limits the rotational speed of the encoder. The embodiment of FIG. 6, presenting only smooth disc-shaped external components, avoids this problem because the turbulence that it creates while rotating is minimal.

Since an ultrasonic pulse reflects off of any surface between two different mediums, for example the surface between the disc 50 and the liquid in which it is immersed, and the surface between the solid portion of the disc 50 and the hollowed involute portion 52, the ultrasonic pulse produced by the probe 10 will be reflected off of both of these surfaces and the time difference between the reflected pulses will indicate the point of reflection off of the involute curve. As in the other embodiments, only the first two reflected pulses received by the probe 10 are processed after a pulse is emitted.

Experience has shown that water temperature affects the speed of sound in water and therefore affects the time delay. Thus changes in water temperature can introduce measurement error. When the transducer is aimed at the involute transition, a separate signal is received from each end of the reflecting edge 26. Since the distance between the ends 30, 32 of the involute edge 26 remains fixed, the time difference at this point allows the water temperature to be determined from this time difference. The temperature value, once determined in this manner, can then be used to correct for the error that is introduced by temperature changes.

Cross-correlation techniques may be used to measure time delay more accurately than would otherwise be achievable. This is done as follows:

An initial approximation is obtained by measuring the time difference between zero-crossings with a resolution of 0.01 microseconds. The cross-correlation is calculated between the received waveform and a reference waveform stored in computer memory, both of which have been acquired and digitized at a rate of 100 megasamples per second. The reference waveform is shifted by 0.01 microseconds and the cross-correlation is recalculated. This process is repeated, producing a set of points which form a curve. Conventional curve fitting techniques are used to find the maximum of this curve, which corresponds to the time difference between the two waves, but determined to a resolution within a fraction of 0.01 microseconds.

An algorithm may be added to the processing means, to use the measurement to produce the same type of quadrature output that is normally found in commercially available optical encoders. This allows the ultrasonic encoder to be used in conjunction with equipment which has been designed to accommodate standard optical encoder quadrature signals.

Other types of distance measuring instrumentation may be used with the rotor 20 of the present invention, for example light transceivers using an interferometer to measure the distance of the source from the rotor 20. However, it is believed that in under water applications sound transmission would be preferred in most cases due to the lower cost of the instrumentation required.

The invention having been thus described by way of example of a preferred embodiment, it will be apparent to those skilled in the art that certain modifications and adaptations may be made without departing from the scope of the invention, as set out in the appended claims.

We claim:

1. A device for monitoring the angular displacement of a rotating shaft, comprising:

a rotor mounted coaxially with the shaft for rotation therewith, the rotor being provided with a reflecting edge configured in the profile of an involute curve, transmitting means positioned to transmit an energy wave towards the reflecting edge in a direction perpendicular thereto, and receiving means positioned to receive the energy wave after reflection from the reflecting edge whereby the path length travelled by the energy wave is linearly related to the angular displacement of the shaft from a datum position.

2. The device of claim 1 in which the reflecting edge is provided on a vane attached to the rotor.

3. The device of claim 2 in which the vane is associated with a circular disc having a circular reflecting edge coaxial with a hub of the rotor.

4. The device of claim 3 wherein the circular disc is provided with a hollowed out portion which includes the involute reflecting edge.

5. The device of claim 4 including a cover which conceals the hollowed out portion of the circular disc.

6. The device of claim 2 in which the rotor includes a plurality of such vanes distributed circumferentially, each vane terminating at or beyond the angular position of commencement of the next vane.

7. The device of claim 6 in which the rotor includes four vanes distributed around a hub.

8. The device of claim 6 including a counter for counting transitions between a distal end of a vane and a proximal end of a vane, and adjusting the calculation of angular displacement accordingly.

9. The device of claim 2 including a counter for counting transitions between a distal end of a vane and a proximal end of a vane, and adjusting the calculation of angular displacement accordingly.

10. The device of claim 1 in which the means for transmitting the energy wave is an ultrasonic transmitter which produces ultrasonic pulses, and the means for receiving the energy wave is an ultrasonic receiver which receives ultrasonic pulses.

11. The device of claim 1 wherein the reflecting edge is contained within a disc having a hollowed out portion.

12. A method of measuring the angular displacement of a rotary shaft provided with a rotor having a reflecting edge configured in the profile of an involute curve, comprising periodically reflecting an energy wave off of the reflecting edge, measuring a delay between transmission of the energy wave and reception of the reflected energy wave, and determining the angular displacement of the shaft from the delay.

13. The method of claim 12 in which the involute reflecting edge is associated with a circular disc having a circular reflecting edge coaxial with a hub of the rotor, and the energy wave is reflected off of the circular reflecting edge and the involute reflecting edge, including the steps of measuring a delay between transmission of the energy wave and reception of the reflected energy wave off of the circular reflecting edge, and calculating the distance between the involute reflecting edge and the circular reflecting edge and determining the angular displacement of the shaft therefrom.

14. The method of claim 13 in which the involute reflecting edge is contained within the circular disc.

15. The method of claim 13 in which the involute reflecting edge is provided on a vane associated with the circular disc.

16. The method of claim 12 in which an involute reflecting edge is provided on a plurality of vanes associated with the circular disc, such vanes being distributed circumferentially and each vane terminating at or beyond the angular position of commencement of the next vane.

17. The method of claim 16 including a counter for counting transitions between a distal end of a vane and a proximal end of a vane and adjusting a calculation of angular displacement accordingly.

* * * * *